US007761296B1

(12) United States Patent
Bakis et al.

(10) Patent No.: US 7,761,296 B1
(45) Date of Patent: Jul. 20, 2010

(54) SYSTEM AND METHOD FOR RESCORING N-BEST HYPOTHESES OF AN AUTOMATIC SPEECH RECOGNITION SYSTEM

(75) Inventors: Raimo Bakis, Briarcliff Manor, NY (US); Ellen M. Eide, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/286,099

(22) Filed: Apr. 2, 1999

(51) Int. Cl.
*G10L 17/00* (2006.01)
*G10L 15/00* (2006.01)
(52) U.S. Cl. ...................... 704/247; 704/238
(58) Field of Classification Search ............... 704/238, 704/247, 260
See application file for complete search history.

(56) References Cited

U.S. PATENT DOCUMENTS

| 5,548,647 | A | * | 8/1996 | Naik et al. ............ 704/200 |
| 5,995,930 | A | * | 11/1999 | Hab-Umbach et al. ...... 704/254 |
| 6,078,885 | A | * | 6/2000 | Beutnagel ............ 704/258 |
| 6,269,335 | B1 | * | 7/2001 | Ittycheriah et al. ......... 704/270 |
| 6,591,240 | B1 | * | 7/2003 | Abe ................. 704/278 |

OTHER PUBLICATIONS

Bakis, R., "An Articulatory-Like Speech Production Model with Controlled Use of Prior Knowledge", Frontiers in Speech CD-Rom 1993.
Schwartz, et al., "The N-Best Algorithm: An Efficient and Exact Procedure for Finding the N Most Likely Sentence Hypotheses", Reprinted from Proceedings of the ICASSP 90-1990 International Conference on Acoustics, Speech and Signal Processing, Albuquerque, New Mexico, Apr. 3-6, 1990, pp. 81-84.
Wegmann, et al., "Speaker Normalization On Conversational Telephone Speech", vol 1, Proc. ICASSP. 1996, pp. 339-341.
Eide, et al., "A Parametric Approach to Vocal-Tract-Length Normalization", Proceedings of the Fifteenth Annual Speech Research Symposium. Johns Hopkins University. 1995.
Donovan, et al., "Improvements in an HMM-Based Speech Synthesizer", Proc. Eurospeech-95, Madrid, pp. 574-576.
Forney, G. David, Jr., "The Viterbi Algorithm", Proceedings of the IEEE, vol. 61, No. 3, Mar. 1973, pp. 268-278.

* cited by examiner

*Primary Examiner*—Angela A Armstrong
(74) *Attorney, Agent, or Firm*—F. Chau & Associates, LLC

(57) ABSTRACT

A system and method for rescoring the N-best hypotheses from an automatic speech recognition system by comparing an original speech waveform to synthetic speech waveforms that are generated for each text sequence of the N-best hypotheses. A distance is calculated from the original speech waveform to each of the synthesized waveforms, and the text associated with the synthesized waveform that is determined to be closest to the original waveform is selected as the final hypothesis. The original waveform and each synthesized waveform are aligned to a corresponding text sequence on a phoneme level. The mean of the feature vectors which align to each phoneme is computed for the original waveform as well as for each of the synthesized hypotheses. The distance of a synthesized hypothesis to the original speech signal is then computed as the sum over all phonemes in the hypothesis of the Euclidean distance between the means of the feature vectors of the frames aligning to that phoneme for the original and the synthesized signals. The text of the hypothesis which is closest under the above metric to the original waveform is chosen as the final system output.

11 Claims, 3 Drawing Sheets

SYSTEM AND METHOD FOR RESCORING N-BEST HYPOTHESES OF AN AUTOMATIC SPEECH RECOGNITION SYSTEM

GOVERNMENT LICENSE RIGHTS

This invention was developed under United States Government ARPA Contract No. MDA 972-97-00012. The United States Government has certain rights to the invention.

BACKGROUND

1. Technical Field

The present invention relates generally to speech recognition and, more particularly, to a system and method for rescoring N-best hypotheses output from an automatic speech recognition system by utilizing an independently derived text-to-speech (TTS) system to generate a synthetic waveform for each N-best hypothesis and comparing each synthetic waveform with the original speech waveform to select the final system output.

2. Description of Related Art

A common technique which is utilized in speech recognition is to first produce a list of the N most-likely ("N-best") hypotheses for each utterance and then rescore each of the N-best hypotheses using one or more knowledge sources not necessarily modeled by the speech recognition system which produced the N-best hypotheses. Advantageously, this "N-best rescoring" method enables additional knowledge sources to be brought to bear on the recognition task without having to integrate such sources into the initial decoding system.

One such "N-best rescoring" method is disclosed in "An Articulatory-Like Speech Production Model with Controlled Use of Prior Knowledge" by R. Bakis, Frontiers in Speech, CD-Rom, 1993. With this method, an articulatory model which generates acoustic vectors (not speech waveforms) given a phonetic transcription is utilized to produce acoustics against which the original speech may be compared. Other "rescoring" methods are known to those skilled in the art.

As is understood by those skilled in the art, the techniques utilized for speech recognition and speech synthesis are inherently related. Consequently, increased knowledge and understanding and subsequent improvements for one technique can have profound implications for the other. Due to the recent advances in text-to-speech (TTS) systems which have enabled high quality synthesis, it is to be appreciated that a TTS system can sufficiently provide a source of knowledge about what the speech signal associated with each of the N-hypothesis would look like. Currently, there exists no known systems or methods which utilize a TTS system for rescoring N-best hypotheses. Therefore, based on the similarities between speech recognition and speech synthesis, it is desirable to employ a TTS system as a knowledge source for use in rescoring N-best hypotheses.

SUMMARY OF THE INVENTION

The present invention is directed to a system and method for rescoring N-best hypotheses of an automatic speech recognition system, wherein the N-best hypotheses comprise the N most likely text sequences of a decoded original waveform. In one aspect of the present invention, a method for rescoring N-best hypotheses comprises the steps of:

generating a synthetic waveform for each of the N text sequences;

comparing each synthetic waveform with the original waveform to determine the synthetic waveform that is closest to the original waveform; and selecting for output the text sequence corresponding to the synthetic waveform determined to be closest to the original waveform.

In another aspect of the present invention, in order to compare the original and synthetic waveforms, each is transformed into a set of feature vectors using the same feature analysis process.

In another aspect of the present invention, the original and each of the synthetic waveforms representing the Nth hypotheses are compared on a phoneme-by-phoneme basis by segmenting (aligning) the stream of feature vectors into contiguous regions, each region representing the physical representation of one phoneme in the phonetic expansion of the hypothesized text sequence.

In another aspect of the present invention, an automatic speech recognition system comprises:

a decoder for decoding an original waveform of acoustic utterances to produce N text sequences, the N text sequences representing N-best hypotheses of the decoded original waveform;

a waveform generator for generating a synthetic waveform for each of the N text sequences; and a comparator for comparing each synthetic waveform with the original waveform to rescore the N-best hypotheses.

Advantageously, by comparing the synthetic waveforms (for each of the N most-likely text sequences) to the original waveform, one can incorporate the body of knowledge and understanding required to build the synthesis model into the N-best framework for rescoring the top N hypotheses.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

It is to be understood that the system and method described herein may be implemented in various forms of hardware, software, firmware, special purpose microprocessors, or a combination thereof. Preferably, the present invention is implemented in software as an application program tangibly embodied on a program storage device. The application program may be uploaded to, and executed by, a machine having any suitable and preferred microprocessor architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented as software modules, the actual connections between the system components (or the process steps) may differ depending upon the manner in which the present invention is programmed. Given the teachings herein, one of ordinary skill in the related art will be able to contemplate these and similar implementations or configurations of the present system and method.

Figure 1:
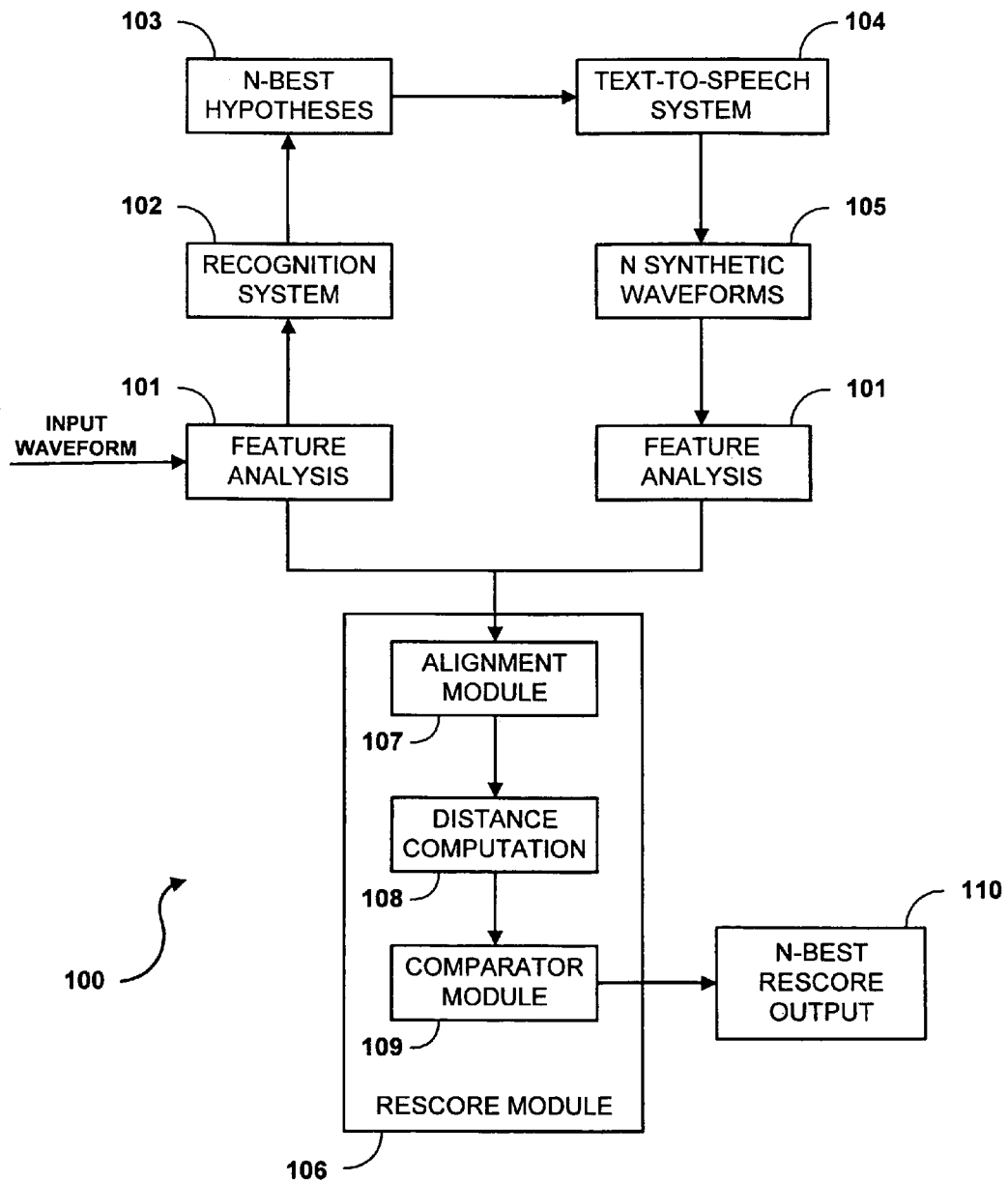
FIG. 1 is a block/flow diagram of a system/method for rescoring N-best hypotheses in accordance with an embodiment of the present invention.

Referring now to FIG. 1, a block diagram illustrates a system for rescoring N-best hypotheses of an automatic speech recognition system in accordance with an embodiment of the present invention. It is to be understood that the diagram depicted in FIG. 1 can also be considered a general flow diagram of a method for rescoring N-best hypotheses in accordance with the present invention. The system 100 includes a feature analysis module 101 which receives and digitizes input speech waveforms (spoken utterances), and transforms the digitized input waveforms into a set of feature vectors on a frame-by-frame basis using feature extraction techniques known by those skilled in the art. Typically, the feature extraction process involves computing spectral or cepstral components and corresponding dynamics such as first and second derivatives. Preferably, the feature analysis module 101 operates by first producing a 24-dimensional cepstra feature vector for every 10 ms of the input waveform, splicing nine frames together (i.e., concatenating the four frames to the left and four frames to the right of the current frame) to augment the current vector of cepstra, and then reducing each augmented cepstral vector to a 60-dimensional feature vector using linear discriminant analysis. The input (original) waveform feature vectors are then stored for subsequent processing as discussed below.

The original waveform feature vectors are then decoded by a speech recognition system 102 having trained acoustic prototypes to recognize and transcribe the spoken words of the original waveform. In particular, the speech recognition system 102 is configured to generate N-best hypotheses 103 (i.e., the N most-likely text sequences (transcriptions) of the spoken utterances). It is to be understood that any conventional technique may be employed in the speech recognition system 102 for generating the N-best hypotheses such as the method disclosed in "The N-Best Algorithm: An Efficient and Exact Procedure For Finding the N Most Likely Sentence Hypotheses" by Schwartz, et al., pp. 81-84. Proc. ICASSP, 1990.

The N-best hypotheses 103 are input to a text-to-speech system (TTS) 104 to generate a set of N synthetic waveforms 105, each synthetic waveform being a text sequence corresponding to one of the N-best hypotheses 103. It is to be understood that any conventional TTS system may be employed for implementing the present invention, although the preferred TTS system is International Business Machines' (IBM) trainable text-to-speech system disclosed in U.S. patent application Ser. No. 09/084,679, entitled: "Methods For Generating Pitch And Duration Contours In A Text To Speech System," which is commonly assigned and incorporated herein by reference.

Briefly, with the IBM TTS system, the pronunciation of each word capable of being synthesized is characterized by its entry in a phonetic dictionary, with each entry comprising a string of phonemes which constitute the corresponding word. The TTS system concatenates segments of speech from phonemes in context to produce arbitrary sentences. A flat pitch equal to a training speaker's average pitch value is utilized to synthesize each segment. The duration of each segment is selected as the average duration of the segment in the training corpus plus a user-specified constant $\alpha$ times the standard deviation of the segment. The $\alpha$ term serves to control the rate of the synthesized speech and is fixed at a moderate value for all our experiments. The TTS system is built from data spoken by one male speaker who read 450 sentences of text. In operation, the IBM TTS system receives user-selected text sentence(s) and expands each word into a string of constituent phonemes by utilizing the synthesis dictionary. Next, waveform segments for each phoneme are retrieved from storage and concatenated. The details of the procedure by which the waveform segments are chosen are described in the above-incorporated application. The pitch of the synthesis waveform is adjusted to flat using the pitch synchronous overlap and add (PSOLA) technique, which is also described in the above-incorporated application. The N synthetic waveforms are then saved to disk.

Each of the N synthetic waveforms 105 are input to the feature analysis module 101 and subjected to the same feature analysis as discussed above (for processing the original speech waveform) to generate N sets of feature vectors, with each set of feature vectors representing a corresponding one of the N synthetic waveforms 105. The N sets of feature vectors may be stored for subsequent processing. It is to be understood that for purposes of illustration and clarity, the system of FIG. 1 is shown as having two feature analysis modules 101, although the system is preferably implemented using one feature analysis module for processing both the original and synthetic waveforms.

A rescore module 106 compares the original waveform feature vectors with each of the N sets of synthetic waveform feature vectors and corresponding N-best text sequences to provide an N-best rescore output 110. In particular, this comparison processes begins in alignment module 107, whereby the original waveform feature vectors and each set of N synthetic waveform feature vectors are aligned to the text sequence of the corresponding N-best hypothesis. A distance computation module 108 calculates the distance between the original waveform and each of the N synthetic waveforms (using methods known to those skilled in the art). A comparator module 109 compares each of the calculated distances to rescore the N-best hypothesis based on the computed distances and determine the closest distance. The N-best text sequence corresponding to the closest synthetic waveform to the original speech is then output or otherwise saved as the final transcription of the utterance (i.e., the N-best rescore output 110).

Figure 2A:
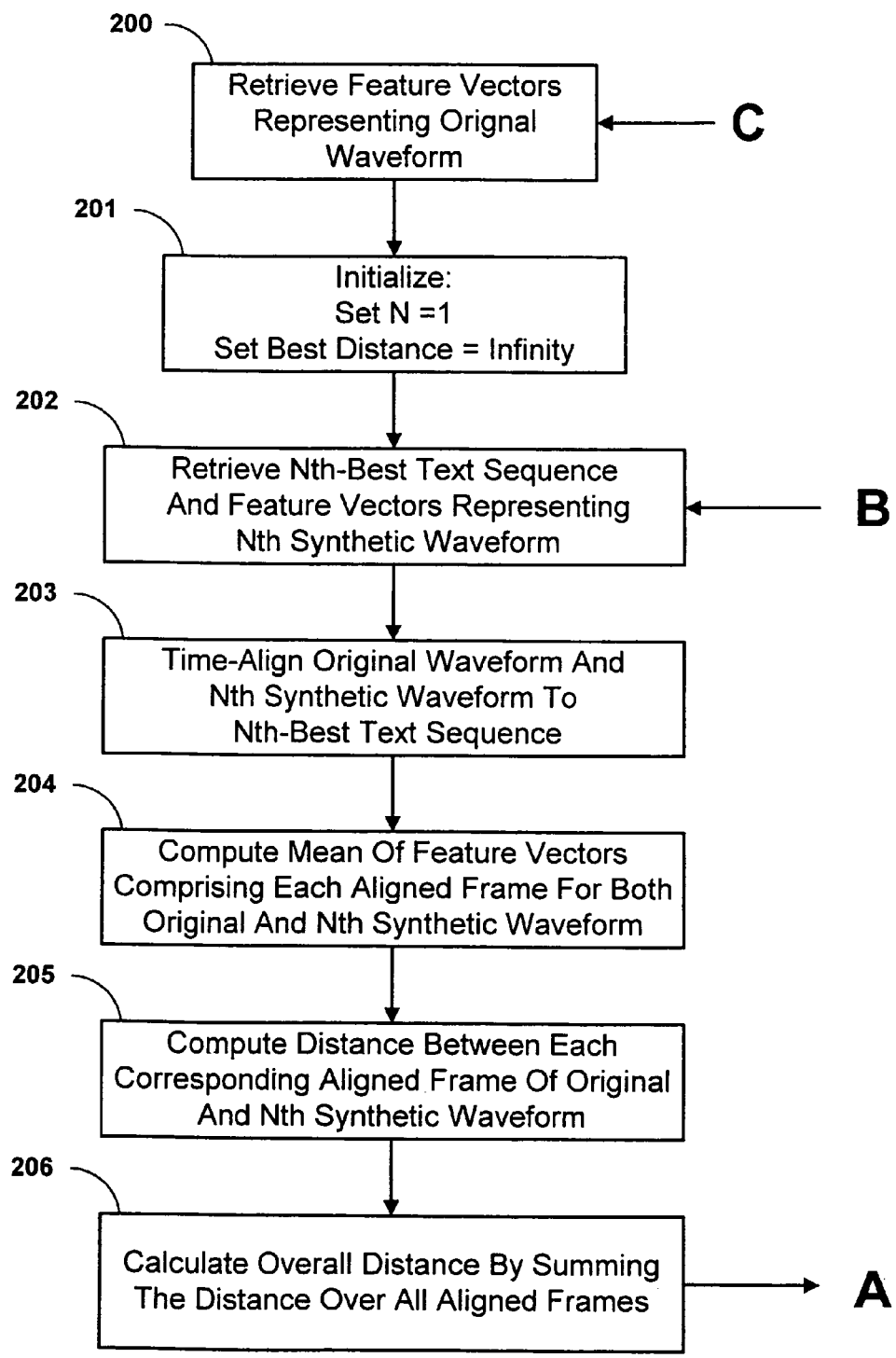
FIGS. 2A and 2B comprise a detailed flow diagram of a method for rescoring N-best hypotheses in accordance with one aspect of the present invention.
Figure 2B:
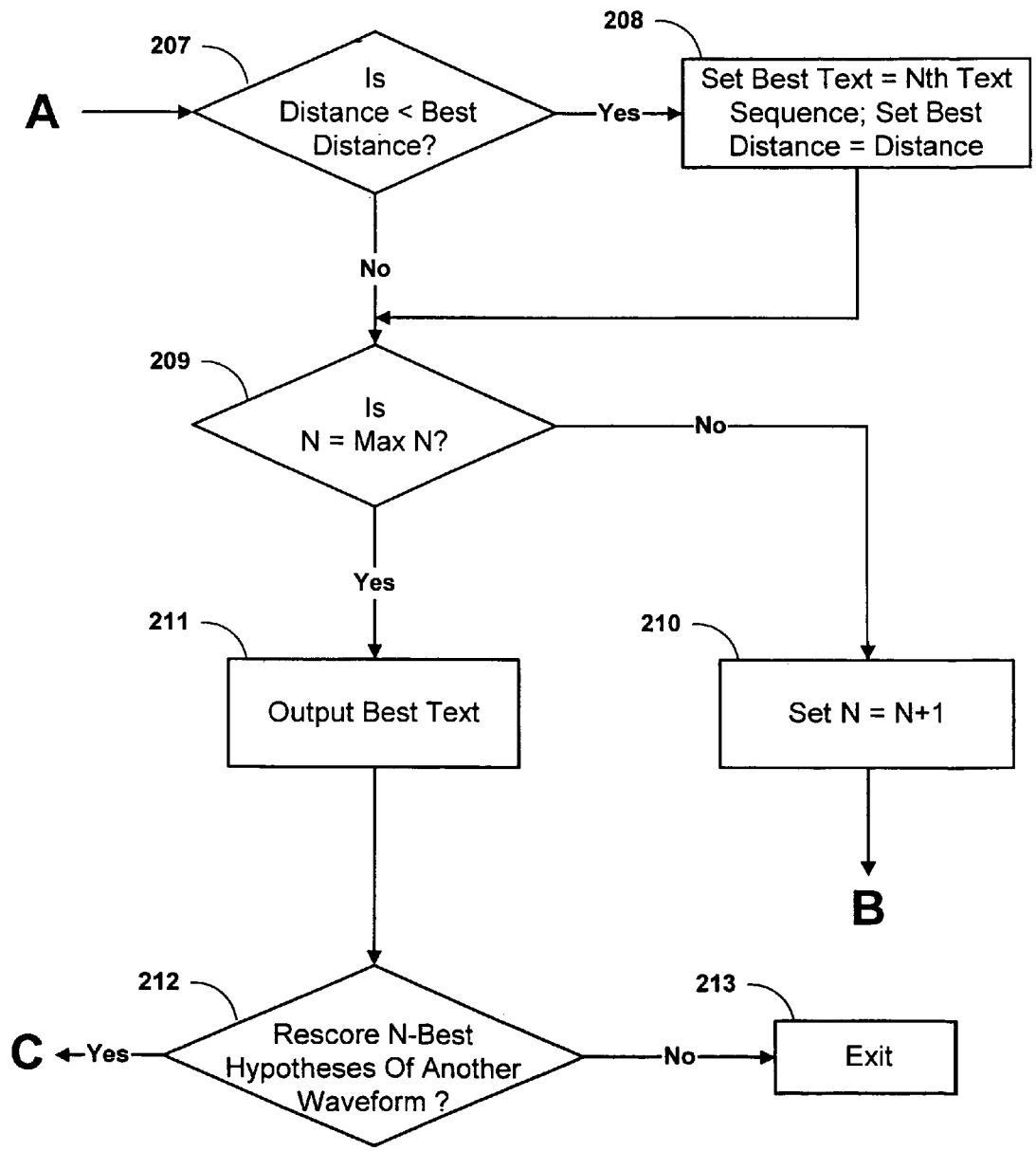

Referring now to FIGS. 2A and 2B, a flow diagram illustrates a preferred method for rescoring N-best hypotheses of an automatic speech recognition system in accordance with the present invention. Specifically, the flow diagram of FIGS. 2A and 2B illustrates a detailed comparison process which is preferably employed in the rescore module 106 of FIG. 1. Initially, the rescore module 106 retrieves the original waveform feature vectors from memory (step 200). The comparison process is then initialized by setting a parameter N=1 (where N represents the Nth-best hypothesis (text sequence) output from the speech recognition system 102) and setting a parameter "Best Distance"=infinity (where "Best Distance" is a threshold value that represents the smallest computed distance measure of previous iterations) (step 201).

Next, the Nth-best text sequence and the corresponding Nth synthetic waveform feature vectors are then retrieved from memory (step 202). The original waveform feature vectors and the Nth synthetic waveform feature vectors are then time-aligned to the Nth-best text sequence at the phoneme level (step 203). The alignment procedure preferably employs a Viterbi alignment process such as disclosed in "The Viterbi Algorithm," by G. D. Formey, Jr., Proc. IEEE, vol. 61, pp.

268-278, 1973. In particular, as is understood by those skilled in the art, the Viterbi alignment finds the most likely sequence of states given the acoustic observations, where each state is a sub-phonetic unit and the probability density function of the observations is modeled as a mixture of 60-dimensional Gaussians. It is to be appreciated that by time-aligning the original waveform and the Nth synthesized waveform to the Nth hypothesized text sequence at the phoneme level, each waveform may be segmented into contiguous time regions, with each region mapping to one phoneme in the phonetic expansion of the Nth text sequence (i.e., a segmentation of each waveform into phonemes).

After the alignment process, the mean of the feature vectors (frames) which align to each phoneme is computed for the original waveform and the Nth synthetic waveform (step 204). In this manner, the original waveform and the Nth synthetic waveform may be represented as a collection of mean feature vectors, with each mean feature vector representing the computed mean of all feature vectors aligning to a corresponding phoneme in the Nth text sequence. This process results in the generation of M mean feature vectors representing the original waveform and M mean feature vectors representing the Nth synthetic waveform (where M represents the number of phonemes in the expansion of the Nth text sequence into its constituent phonemes).

Next, a distance measure between each phoneme mean of the original waveform and the corresponding phoneme mean of the Nth synthetic waveform is computed (step 205). Although any suitable method may be employed for computing the distance measure, a Euclidean distance is preferably employed (by the distance computation module 108, FIG. 1). These individual distance measures (between each corresponding phoneme mean) are then summed to produce an overall distance measure (step 206) representing the "distance" between the original waveform and the Nth synthetic waveform corresponding to the Nth text sequence. Therefore, since the Nth synthetic waveform is derived from the Nth-best text sequence, it is to be appreciated that the overall distance measure indirectly represents the "distance" between the original waveform and the Nth-best text sequence.

A determination is then made as to whether the "distance" (which represents the overall distance between the original waveform and the Nth text sequence) is less than the current "Best Distance" value (step 207). If the "distance" is smaller than the "best distance" value (affirmative determination in step 207), a parameter "Best Text" is set so as to label the current Nth-best text sequence as the most accurate transcription encountered as compared to all previous iterations, and the parameter "best distance" is set equal to the current "distance" value (step 208).

A determination is then made as to whether there are any remaining N-best hypotheses for consideration (step 209). If there are additional N-best hypotheses (negative determination in step 209), the parameter N is incremented by one (step 210), and the next Nth-best text sequence and Nth synthetic waveform are retrieved from memory (return to step 202, FIG. 2A). This comparison process (steps 203-208) is repeated for N iterations (to rescore each N-best hypothesis). When it is determined that the final Nth-best hypothesis has been rescored (affirmative determination in step 209), the Nth-best text sequence having the minimum distance to the original waveform (as indicated by the "best text" and "best distance" parameters) is output (step 211). After the final output (step 211), the user may choose to rescore the N-best hypotheses of another original waveform (affirmative result in step 212) in which case the desired waveform will be retrieved from memory (return to step 200) and processed as described above. Alternatively, the user may terminate the rescore process and exit the program (step 213).

The above described preferred embodiment has been tested on speech degraded by the inclusion of additive noise in the form of background music. Test results have indicated an improvement of the word error rate from 27.8 percent to 27.3 percent using the two most-likely text hypotheses for each utterance. The improvement primarily results from a reduction in the number of erroneously inserted words.

It is to be appreciated by those skilled in the are that is some flexibility within the general framework of the present invention, thereby providing alternate embodiments of the above-described preferred embodiment. For instance, as noted above, different methods for measuring the distance between the original and synthetic waveforms may be substituted for the Euclidian distance measure described above.

In another embodiment of the present invention, in addition to re-ordering the N-best list based strictly on the distance of each synthesized hypothesis to the original waveform, the distance may be combined with other scores reflecting our confidence in the correctness of the N-th hypothesis, such as the likelihood of that hypothesis as assessed by the individual components comprising the automatic speech recognition system: the acoustic model and the language model. By combining the distance score with the scores from these sources, information provided by the decoder may be considered in conjunction with the new information provided by the distance score. For example, the scores may be combined by forming the following sum:

$$S_N = -D_N + (a \cdot A_N) + (b \cdot L_N)$$

where $D_N$ is the distance of the N-th hypothesis from the original waveform (as described above); where $A_N$ is the acoustic model score of the N-th hypothesis; where $L_N$ is the language model score of the N-th hypothesis; and where a and b are constants. The text selected for output can then be the text associated with the N'-th hypothesis, where N' is the hypothesis whose score $S_{N'}$ is the maximum score among the N-best hypotheses considered.

In yet another embodiment, the original speech and/or synthetic speech may be further processed t compensate for speaker-dependent variations. For example, a vocal tract length normalization process (such as disclosed in "A Parametric Approach to Vocal-Tract-Length Normalization", by Eide et al., Proceedings of the Fifteenth Annual Speech Research Symposium, Johns Hopkins University, 1995; and "Speaker Normalization on Conversational Telephone Speech", by Wegmann et al., Vol. 1, Proc. ICASSP, pp. 339-341, 1996) may be performed on each test utterance to warp the frequency axis for each test speaker to match the vocal-tract characteristics of the speaker from whose data the TTS system was built. This would reduce the component in the distance between utterances due to differences between the speaker of the original test utterance and the speaker of the TTS system, which causes a relative increase of the contribution to the distance scores due to phonetic differences between the utterances.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer readable medium storing a computer program to perform method steps for execution by a processor, the method steps comprising:

generating a synthetic waveform for each of N textual transcriptions of an original waveform, wherein N is greater than 1 and the N textual transcriptions are generated by a speech recognition system and represent N-best textual transcription hypotheses of the original waveform;

for each synthetic waveform,
time-aligning feature vectors of the synthetic waveform with feature vectors of the original waveform at a phoneme level;
computing a mean of the feature vectors which align to each phoneme for the original waveform and the synthetic waveform;
computing a distance measure between each phoneme mean of the original waveform and the synthetic waveform;
summing the distance measures to generate an overall distance measure representing a distance between the original waveform and the synthetic waveform;
comparing scores based on the overall distance measure between the synthetic waveform and the original waveform, an acoustic model score of a corresponding textual transcription of the synthetic waveform, and a language model score of the corresponding textual transcription to determine a corresponding one of the N-best textual transcriptions; and
selecting for output the determined N-best textual transcription.

2. The computer readable medium of claim 1, wherein the alignment is performed using a Viterbi alignment process.

3. A method for recognizing speech, the method comprising the steps of:

generating a synthetic waveform for each of N textual transcriptions of an original waveform, wherein N is greater than 1 and the N textual transcriptions are generated by a speech recognition system and represent N-best textual transcription hypotheses of the original waveform;
for each synthetic waveform,
computing a distance measure between the synthetic waveform and the original waveform;
summing the distance measures to generate an overall distance measure representing a distance between the original waveform and the synthetic waveform;
generating a score S from the overall distance measure D, an acoustic model score A of the corresponding textual transcription for the synthetic wave, and a language model score L of the corresponding textual transcription, wherein the score $S=-D+(a*A)+(b*L)$, and 'a' and 'b' are constants;
selecting for output one of the textual transcriptions corresponding to the synthetic waveform having the score that indicates the synthetic wave is closest to the original waveform.

4. The method of claim 3, further comprising:
aligning frames of the original waveform and frames of each synthetic waveform to a corresponding one of the N textual transcriptions; and
calculating the distance measure between the original waveform and each of the synthetic waveforms based on the corresponding alignments.

5. The method of claim 4, further comprising:
retrieving feature vectors corresponding to the original waveform; and
generating feature vectors for each synthetic waveform such that the feature vectors for the synthetic waveforms are-similar in structure to the feature vectors of the original waveform,
wherein the alignment is performed by time-aligning the feature vectors of the original waveform and the feature vectors of each synthetic waveform with the corresponding one of the N textual transcriptions.

6. The method of claim 3, further comprising:
computing a mean feature vector of all feature vectors comprising each aligned frame for both the original and Nth synthetic waveform, wherein the distance measure for each aligned frame is calculated by determining a distance between each means of the corresponding aligned frames.

7. An automatic speech recognition system, comprising:
a decoder for decoding an original waveform of acoustic utterances to produce N textual transcriptions, the N textual transcriptions representing N-best textual transcription hypotheses of the decoded original waveform;
a text to speech system generating a synthetic waveform for each of the N textual transcriptions;
a means to perform a speaker normalization on the original waveform to match vocal-tract characteristics of a speaker from whose data the TTS is derived; and
a comparator for comparing scores based on an overall distance measure between each synthetic waveform and the normalized original waveform, an acoustic model score of a corresponding textual transcription of the synthetic waveform, and a language model score of the corresponding textual transcription to determine a corresponding one of the N-best textual transcriptions to output,
wherein the overall distance measures are computed by a processor:
computing a distance measure between the synthetic waveform and the normalized original waveform; and
summing the distance measures to generate an overall distance measure representing a distance between the normalized original waveform and the synthetic waveform, and
wherein N is greater than 1.

8. The system of claim 7, further comprising a feature analysis processor adapted to generate a set of feature vectors for the normalized original waveform and generate a set of feature vectors for each of the N synthetic waveforms.

9. The system of claim 7, further comprises:
means for aligning frames of the normalized original waveform and frames of each synthetic waveform to a corresponding one of the N textual transcriptions; and
means for calculating the distance measure between the normalized original waveform and each of the synthetic waveforms based on the corresponding alignments.

10. The system of claim 9, wherein the frames are aligned on a phoneme level.

11. The system of claim 9, wherein the means for calculating the distance measures comprises:
means for calculating an individual distance between each aligned frame of the original normalized waveform and each of the N synthetic waveforms; and
means for summing the individual distances of the aligned frames of the original normalized waveform and each synthetic waveform to compute the overall distance measures between the original normalized waveform and each synthetic waveform.

* * * * *